United States Patent
King et al.

(10) Patent No.: US 12,479,165 B1
(45) Date of Patent: Nov. 25, 2025

(54) METHOD FOR FABRICATION OF CARCINOGENIC-FREE BAR GUN

(71) Applicant: OEM SOLUTIONS, INC, Bonita Springs, FL (US)

(72) Inventors: Michael D. King, Clarence Center, NY (US); David Santy, La Vernia, TX (US)

(73) Assignee: OEM Solutions, Inc., Cranberry Township, PA (US)

(*) Notice: Subject to any disclaimer, the term of this patent is extended or adjusted under 35 U.S.C. 154(b) by 0 days.

(21) Appl. No.: 17/377,060

(22) Filed: Jul. 15, 2021

Related U.S. Application Data

(60) Provisional application No. 63/052,337, filed on Jul. 15, 2020.

(51) Int. Cl.
*B29C 65/48* (2006.01)
*B29C 65/78* (2006.01)

(52) U.S. Cl.
CPC ...... *B29C 65/4845* (2013.01); *B29C 65/7814* (2013.01)

(58) Field of Classification Search
CPC ............. B29C 65/4845; B29C 65/7814; Y10T 29/49936
See application file for complete search history.

(56) References Cited

U.S. PATENT DOCUMENTS

| | | | | |
|---|---|---|---|---|
| 3,580,425 A | * | 5/1971 | DeMan | B67D 1/0021 222/182 |
| 2008/0223876 A1 | * | 9/2008 | Schroeder | B67D 1/0084 222/144.5 |
| 2010/0147886 A1 | * | 6/2010 | Martindale | B67D 1/0086 222/113 |
| 2012/0325855 A1 | * | 12/2012 | Brown | B29C 66/71 222/144.5 |

FOREIGN PATENT DOCUMENTS

| CN | 104526938 A | * | 4/2015 |
|---|---|---|---|
| JP | 2008063397 A | * | 3/2008 |

OTHER PUBLICATIONS

Permabond UV 632, Technical Data Sheet, Permabond Engineering adhesives, Jun. 2018, https://www.permabond.com/wp-content/uploads/2016/04/UV632_TDS.pdf. (Year: 2018).*

(Continued)

*Primary Examiner* — Christopher W Raimund
(74) *Attorney, Agent, or Firm* — Miguel Villarreal, Jr.; Gunn, Lee & Cave, P.C.

(57) ABSTRACT

A carcinogenic free bar gun handle and method of producing a carcinogenic free bar gun handle where individual plates are molded, stacked on top of each other, and bonded using ultraviolet adhesive. Additional inlets and outlets are machined into the bonded bar gun handle. A series of embossed protrusions and corresponding embossed holes on the plates create machinal fits between the respective plates which increases the strength of the bar gun holder.

5 Claims, 14 Drawing Sheets

(56) References Cited

OTHER PUBLICATIONS

Corbett et al., "Numerical design and multi-objective optimisation of novel adhesively bonded joints employing interlocking surface morphology", International Journal of Adhesion and Adhesives, vol. 78, Jul. 4, 2017, pp. 111-120. (Year: 2017).*

Muncke et al., "Impacts of food contact chemicals on human health: a consensus statement", Environ Health 19, 25 (Mar. 2020), https://ehjournal.biomedcentral.com/articles/10.1186/s12940-020-0572-5. (Year: 2020).*

Smart Plastics Guide, "Healthier Food Uses of Plastics", Inst. For Agric. & Trade Policy, Sep. 2008, https://www.iatp.org/sites/default/files/421_2_102202.pdf. (Year: 2008).*

Acme Plastics, "Cast vs Extruded Acrylic", https://www.acmeplastics.com/cast-vs-extruded#:~: text=Available%20in%20a%20broad%20range,large%20structures%2C%20installations%2C%20etc, Aug. 5, 2017. (Year: 2017).*

* cited by examiner

METHOD FOR FABRICATION OF CARCINOGENIC-FREE BAR GUN

CROSS REFERENCE TO RELATED APPLICATIONS

This application claims the benefit of the filing date of provisional application No. 63/052,337.

STATEMENT REGARDING FEDERALLY SPONSORED RESEARCH OR DEVELOPMENT

None.

BACKGROUND OF THE INVENTION

1. Field of the Invention

The present invention relates to a beverage dispenser. More specifically, the present invention relates to the method of manufacture of a carcinogenic-free bar gun for dispensing beverages.

2. Description of the Related Art

There exist several different types of beverage dispensing devices used in restaurants and bars. These devices are commonly known as "bar guns". Bar guns are generally equipped to connect at one end to several liquid consumables (beverages) via several connections (e.g., plastic tubings) from each beverage container to a central housing. A main connector (usually a plastic tubing) then connects the central housing to the bar gun. A user (e.g., bartender) may select the beverage desired to be dispensed for a customer by pressing a button that actuates the connection for the desired beverage to begin dispensing. The beverage is then dispensed through the bar gun (via the appropriate tubing) and into a receptacle (e.g., mug, glass, etc., . . . ) for the enjoyment of the customer.

Bar gun dispensing heads have primarily been manufactured from machined acrylic plates and bonded together to make a final assembly using a solvent bonding process. It has been discovered that acrylic contains Bisphenol A (BPA) in its chemical makeup which may pose a dangerous health risk to consumers when ingested.

BPA is an organic synthetic compound used to make plastics, such as certain polycarbonates and epoxy resins. BPA-based plastic is clear and tough, and is often incorporated into a variety of consumer goods. For example, BPA-based epoxy resins are used to line and coat the inside of many food and beverage cans and in the manufacture of bar gun dispensing heads. However, the use of BPA products is not without criticism and has been linked to adverse human health effects including reproductive and developmental effects and metabolic disease. BPA is also believed to have carcinogenic properties.

Therefore, there is a need for bar gun to be manufactured using a process that does not include carcinogenic components or materials, thus reducing or eliminating the adverse health effects associated with the use of BPA and making for a safe product for the consumer.

BRIEF SUMMARY OF THE INVENTION

The present invention relates to a method of manufacture of a bar gun dispensing head using components and chemicals, such as a co-polymer, that do not contain BPA. However, doing so poses certain challenges in the bonding process that must be overcome. Co-polymers cannot be bonded using the solvent bonding method. This is due to high chemical resistivity. For this reason, the present invention comprises the use of classes of optically clear adhesives suitable to bond the individual plates of a bar gun dispensing head together.

However, adhesive bonding layers together creates issues with bond strength. The present invention is a unique system for manufacturing an adhesive bonded co-polymer bar gun head with a high level of bond strength and durability.

The bar gun dispensing head is comprised of several layers of material that each are independently fabricated. Once the several layers are prepared, the bonding process causes the layers to adhere together, as further explained below.

In the bonding process, the first layer in placed into a fixture. See, FIG. 1. An applicator is used to apply a precise and proper amount of an adhesive to the plate in strategic areas on the first layer. Once this is complete, the second plate is placed on top of the first. See, FIG. 2. Clamping pressure is applied to the plate (5-20 psi) for 1-5 minutes. The process is repeated until all plates have been assembled.

The adhesive must be fully cured before the assemblies can be used for final machining. Many methods may be used to accelerate this process such as increased ambient temperature and exposure to UV light. The adhesive used in the present invention may be UV-cured or not UV-cured. If the adhesive used is not UV-cured, then the assembly can be removed from the fixture and placed in an oven for fast cure (or use some other comparable and effective curing process) or stored overnight until the adhesive has completely taken set.

Describing now the process to manufacture the bar gun dispensing head, simplified blank plates are obtained and molded from carcinogen-free material. The plate details (e.g., holes, connections, ducts, grooves, etc., . . . ) are machined accordingly for fit and function. Using the specified adhesive and chosen process developed in the present invention, bond each layer, one by one, using a robotic method or by other manual means.

Referring now to FIG. 1, the first plate is placed into the fixture. A bead of adhesive is applied to the first set of plates. This may be accomplished through the use of a robotic dispenser, as shown in FIG. 1.

Referring now to FIG. 2, the second plate is placed on top of the first plate. Even pressure (by use of a weight) is then applied to the plates, as shown in FIG. 3. The amount of weight used and applied on top of the two plates varies but generally can be between two (2) and five (5) pounds (2-5 lbs.) for between 2-5 minutes. The weight is then removed. The process is then repeated for the remaining levels of plates until the assembly has been completed, as shown in FIG. 4.

Once the bar gun dispensing head assembly is complete, if necessary, the assembly is cured accordingly prior to final contouring via a contour machining. The bonded assembly is then machined to final form, as shown in FIG. 5, for customer use.

DETAILED DESCRIPTION OF THE INVENTION

Figure 16:
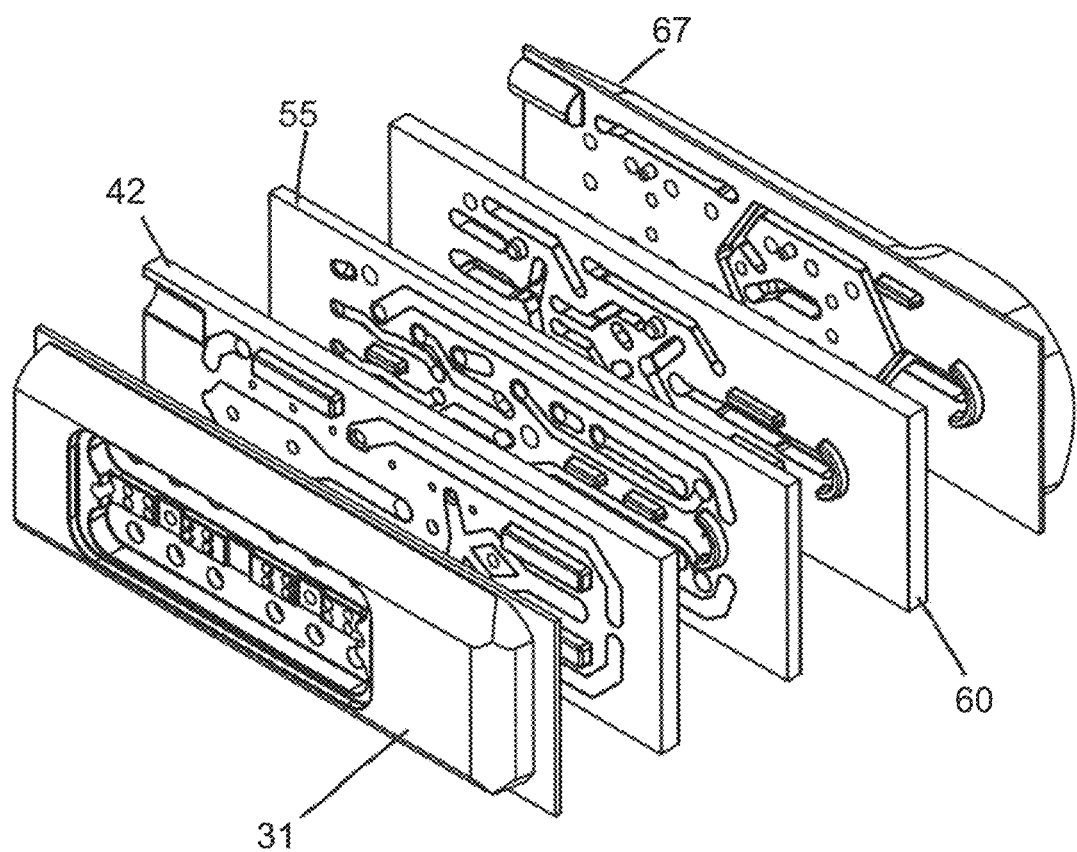
FIG. 16 is an exploded perspective view of embodiments of the first, second, third, fourth, and fifth plates.

A first embodiment of the Method for Fabrication of Carcinogenic-Free Bar Gun is described with reference to FIGS. 6-20. Referring to FIG. 16, the method comprises creating a bar gun handle by bonding five unique plates together.

Figure 1:
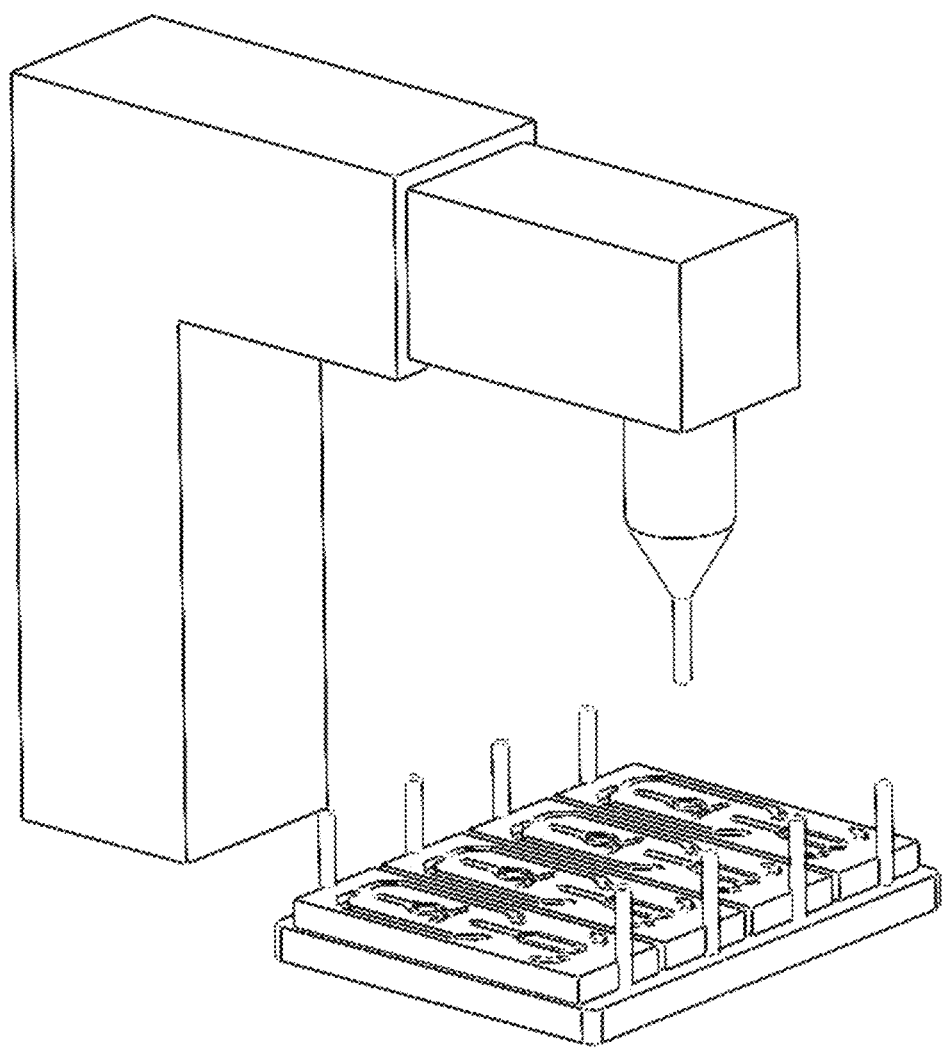
FIG. 1 is a front perspective view of an embodiment of the present invention having a plate secured within the fixture.
Figure 2:
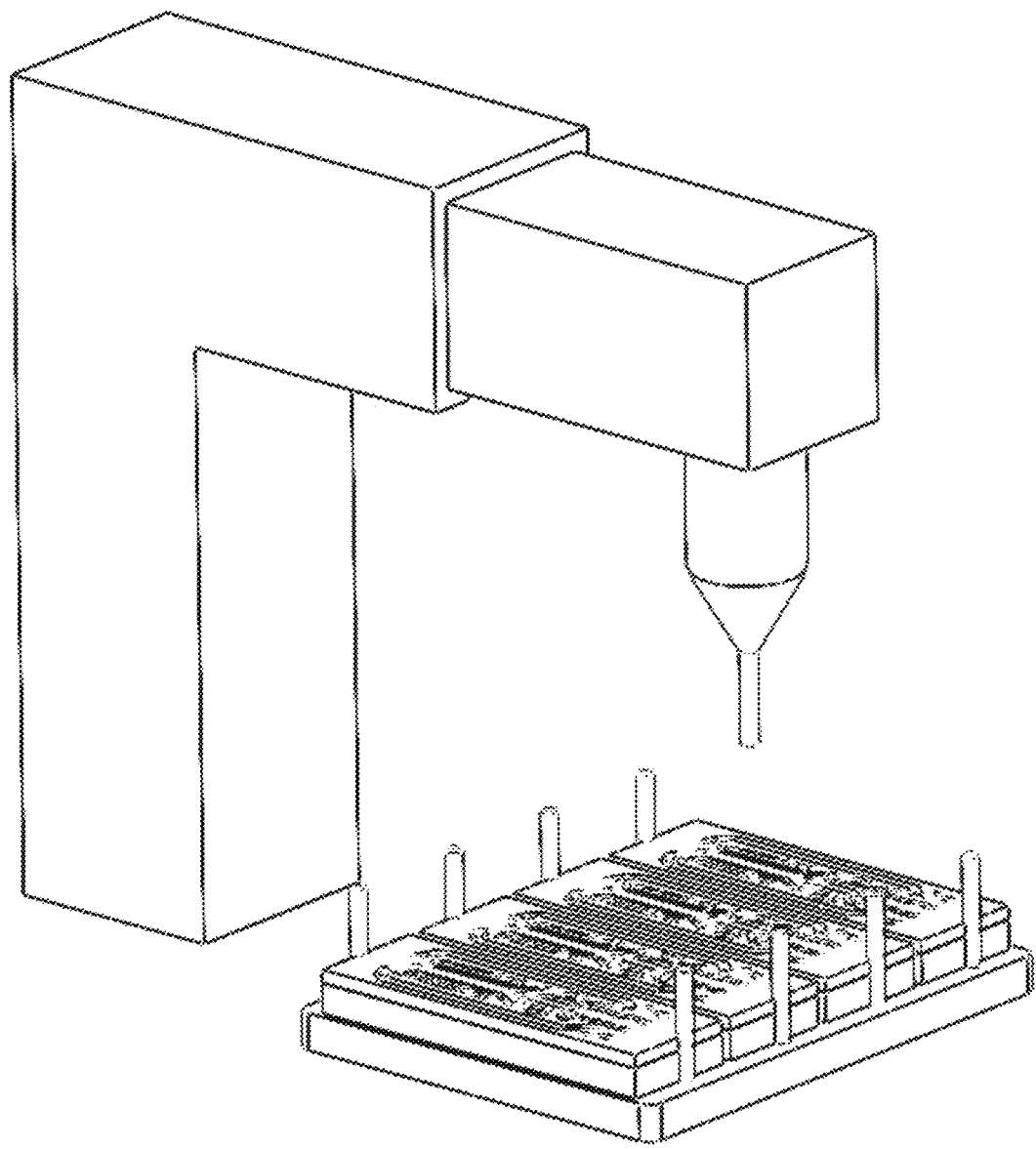
FIG. 2 is a front perspective view of an embodiment of the present invention having multiple plates secured within the fixture.
Figure 3:
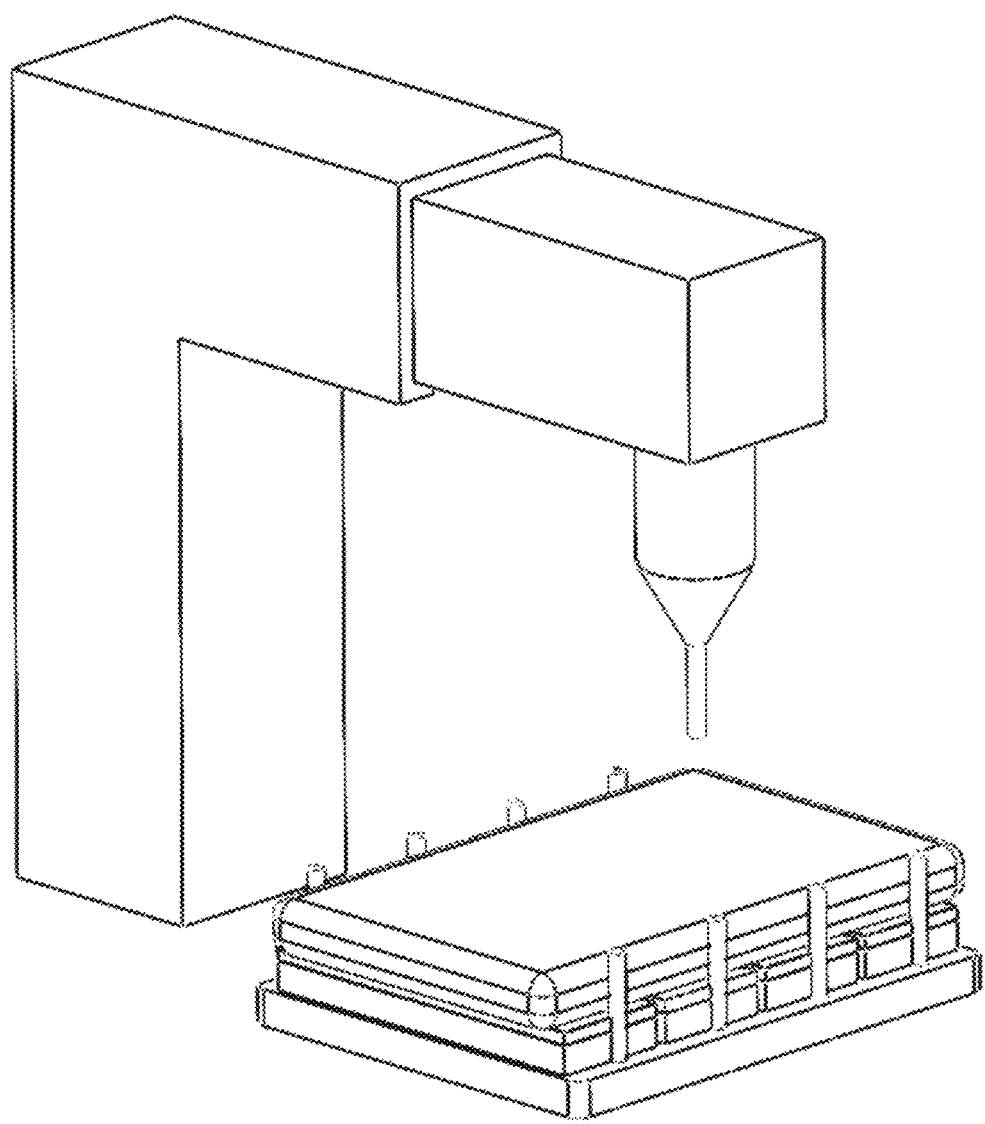
FIG. 3 shows a front perspective view of an embodiment of the present invention having multiple plates and weight thereon, all secured within the fixture.
Figure 4:
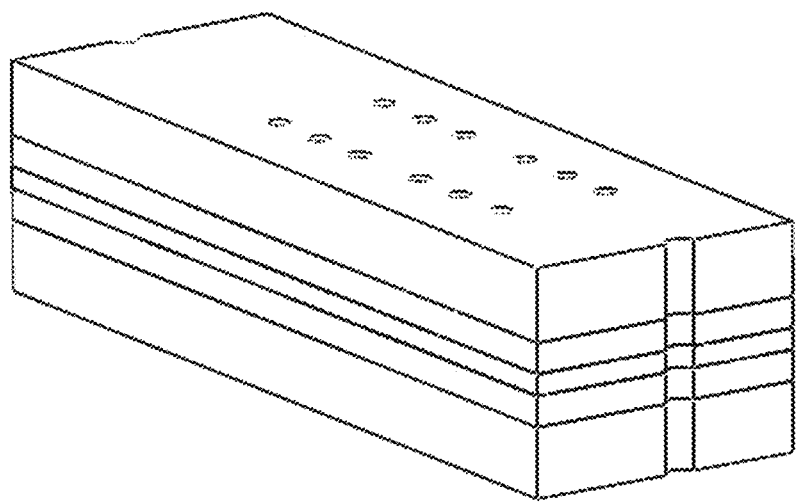
FIG. 4 depicts a front perspective view of an embodiment of the present invention showing the bonded assembly.
Figure 5:
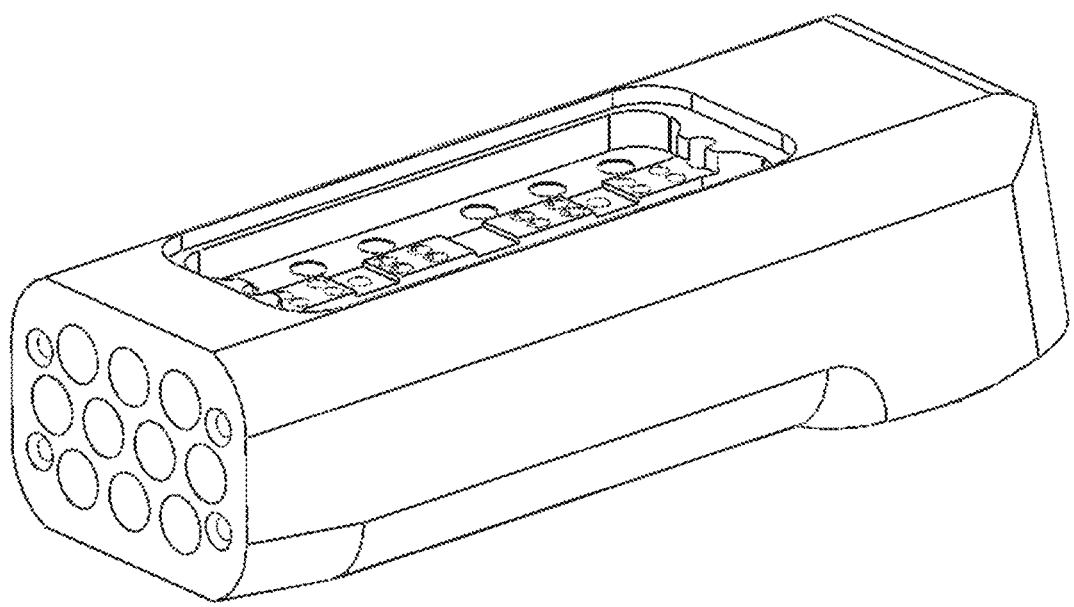
FIG. 5 shows a front view of the bar gun assembly produced by an embodiment of the present invention.
Figure 6:
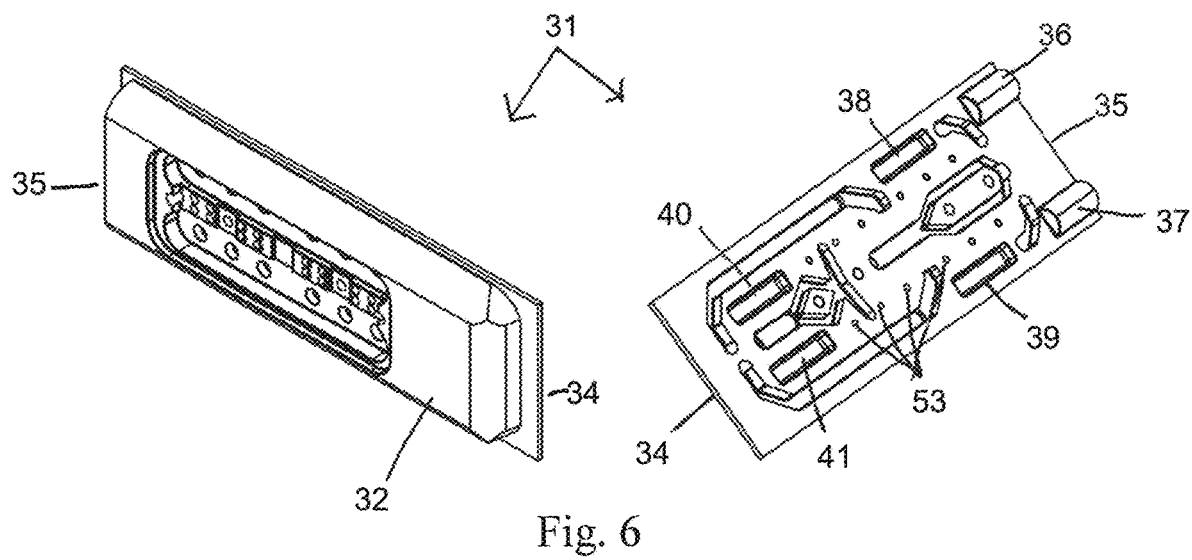
FIG. 6 is a split perspective view of an embodiment of the first plate.
Figure 7:
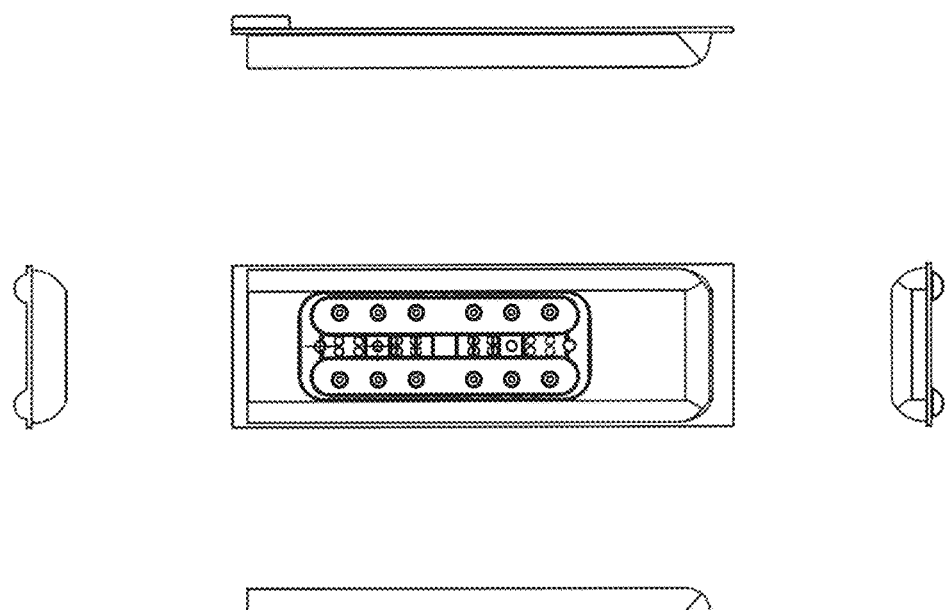
FIG. 7 is a split orthogonal view of FIG. 6.

Referring to FIG. 6, a first plate 31 comprises a first side 32, second side 33, top end 34, and bottom end 35. The second side 33 of the first plate 31 comprises opposing semi-cylindrical protrusions 36, 37 proximate the bottom end 35 near the edges of the first plate 31. The second side 33 of the first plate 31 further comprises a first rectangular prism volume 38, second rectangular prism volume 39, third rectangular prism volume 40, and fourth rectangular prism volume 41. The second side 33 of the first plate 31 further comprises a plurality of semi-spherical volumes 53.

Figure 8:
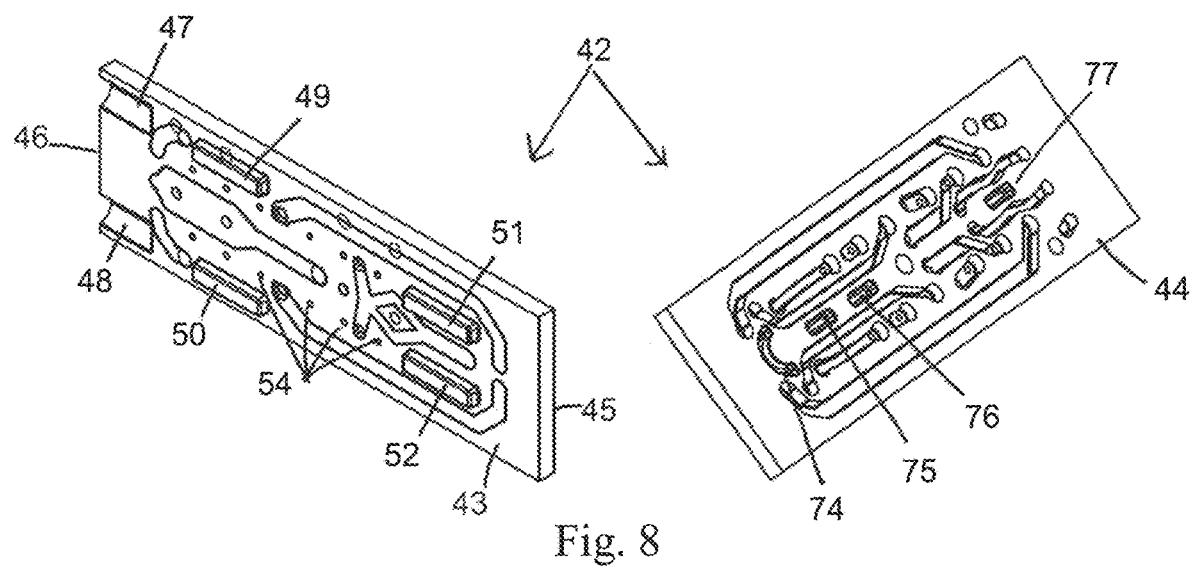
FIG. 8 is a split perspective view of an embodiment of the second plate.
Figure 9:
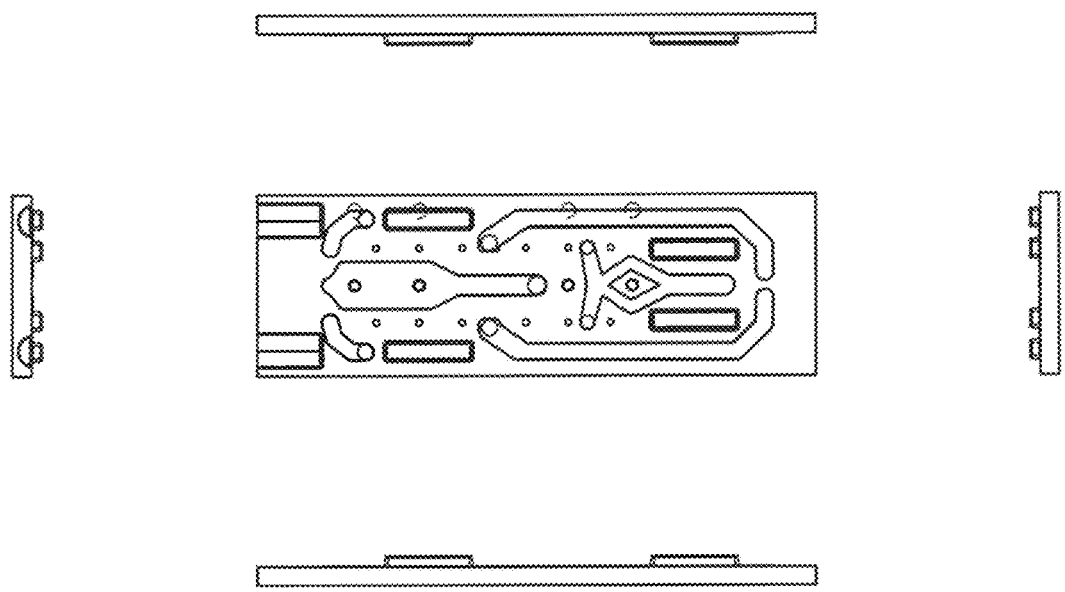
FIG. 9 is a split orthogonal view of FIG. 8.

Referring to FIG. 8, a second plate 42 comprises a first side 43, second side 44, top end 45, and bottom end 46. The first side 43 of the second plate 42 comprises opposing semi-cylindrical volumes 47, 48 proximate the bottom end 46 near the edge of the plate 42. The semi-cylindrical volumes 47, 48 are positioned and sized so that when the second plate 42 is stacked on and bonded to the first plate 31, the semi-cylindrical protrusions 36, 37 of the first plate 31 fit snugly into the semi-cylindrical volumes 47, 48 of the second plate 42.

The first side 43 of the second plate 42 further comprises a first rectangular protrusion 49, second rectangular protrusion 50, third rectangular protrusion 51, and a fourth rectangular protrusion 52. The rectangular protrusions 49, 50, 51, 52 are positioned and sized so that when the second plate 42 is stacked on and bonded to the first plate 31, the rectangular protrusions 49, 50, 51, 52 of the second plate 42 fit snugly into the rectangular volumes 38,39,40,41 of the first plate 31. The rectangular protrusions (or embossed protrusions) mated with the rectangular volumes (or embossed holes) eliminate horizontal shearing of the corresponding plates.

The first side 43 of the second plate 42 further comprises a plurality of semi-spherical bead like protrusions 54. The bead like protrusions 54 are positioned and sized so that when the second plate 42 is stacked on and bonded to the first plate 31, the bead like protrusions 54 of the second plate 41 fit snugly into the plurality of semi-spherical volumes 53 of the first plate 31. The bead like protrusions of second plate 42 mated with the plurality of semi-spherical volumes of first plate 31 eliminate horizontal shearing between the plates.

The second side 44 of the second plate 42 comprises a semi-annular volume 74, a first rectangular prism volume 75, a second rectangular prism volume 76, and a third rectangular prism volume 77.

Figure 10:
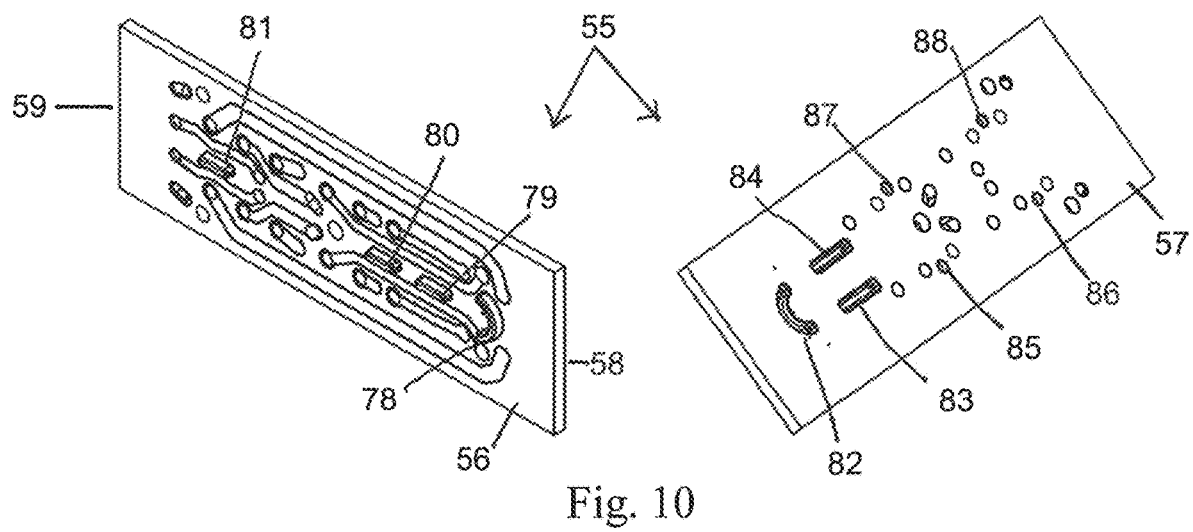
FIG. 10 is a split perspective view of an embodiment of the third plate.
Figure 11:
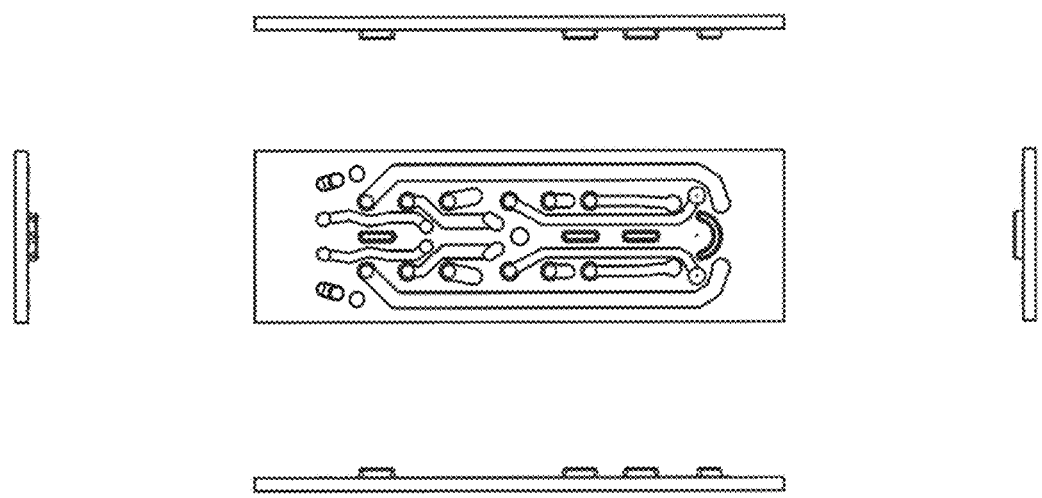
FIG. 11 is split orthogonal view of FIG. 10.

Referring to FIG. 10, a third plate 55 comprises a first side 56, second side 57, top end 58, and a bottom end 59. The first side 56 comprises a semi-annular protrusion 78, first rectangular prism protrusion 79, second rectangular prism protrusion 80, and third rectangular protrusion 81. The semi annular protrusion 78 and rectangular prism protrusions 79, 80, 81 of the third plate 55 are positioned and sized so that when the third plate 55 is stacked on and bonded to the second plate 42, the semi-annular protrusion 78 and rectangular protrusions 79, 80, 81 of the third plate 55 fit snugly into semi-annular volume 74 and rectangular prism volumes 75, 76, 77 of the second plate 42. The semi annular and rectangular prism protrusions of the third plate 55 mated with the semi-annular and rectangular prism volumes of the second plate 42 eliminate horizontal shearing between the plates.

The second side 57 of the third plate 55 comprises a semi-annular volume 82, two rectangular prism volumes 83, 84, and four shallow cylindrical volumes 85, 86, 87, 88.

Figure 12:
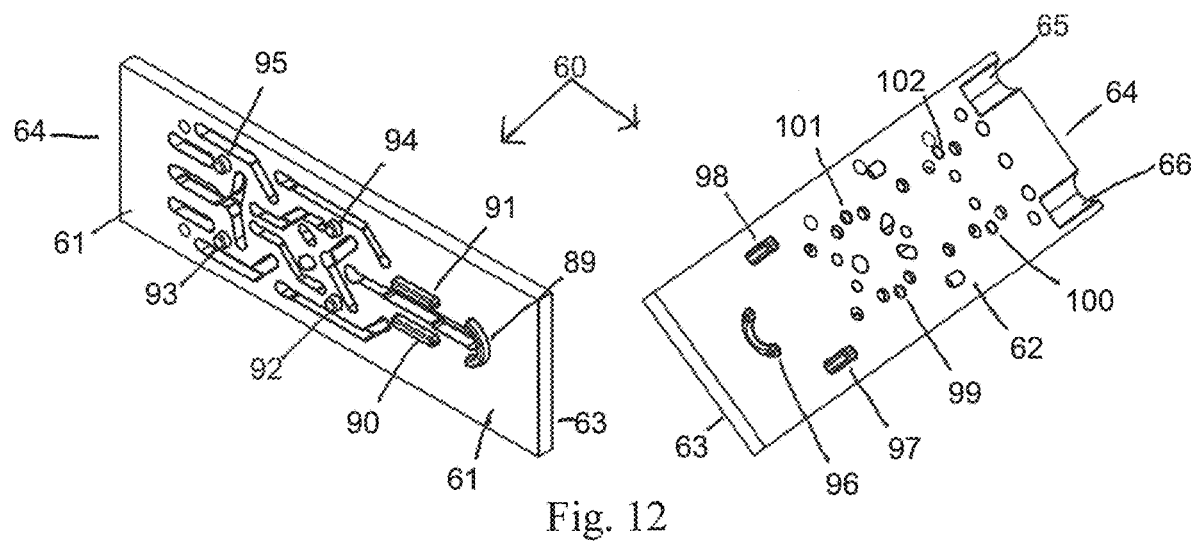
FIG. 12 is a split perspective view of an embodiment of the fourth plate.
Figure 13:
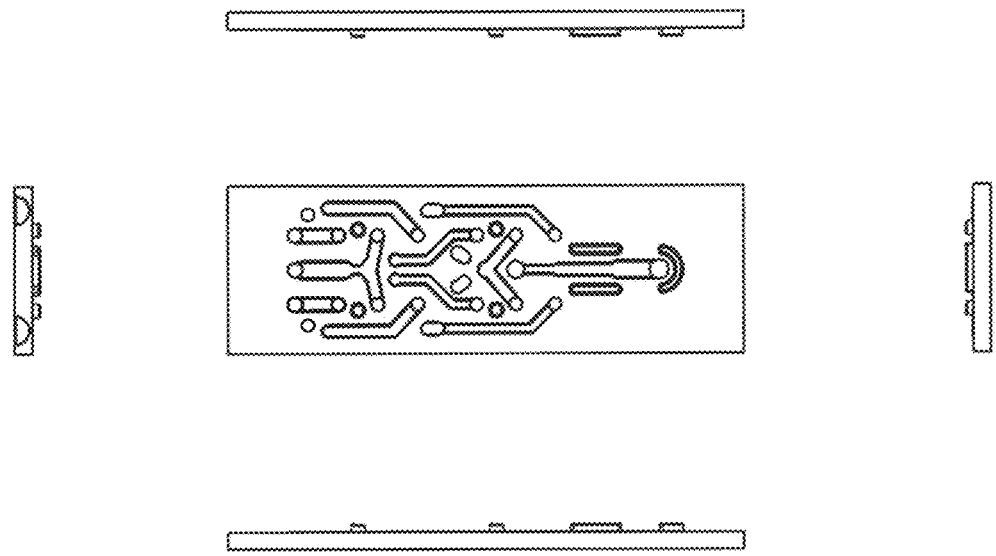
FIG. 13 is a split orthogonal view of FIG. 12.

Referring to FIG. 12, a fourth plate 60 comprises a first side 61, second side 62, top end 63, and a bottom end 64. The first side 61 of the fourth plate comprises a semi-annular protrusion 89, first rectangular prism protrusion 90, second rectangular prism protrusion 91, first cylindrical prism protrusion 92, second cylindrical prism protrusion 93, third cylindrical prism protrusion 94, and fourth cylindrical prism protrusion 95.

The semi annular protrusion 89, rectangular prism protrusions 90, 91, and cylindrical prism protrusions 92, 93, 94, 95 of the fourth plate 60 are positioned and sized so that when the fourth plate 60 is stacked on and bonded to the third plate 55, the semi annular protrusion 89, rectangular prism protrusions 90, 91, and cylindrical prism protrusions 92, 93, 94, 95 of the fourth plate 60 fit snugly into semi-annular volume 82, rectangular prism volumes 83, 84, and cylindrical prism volumes 85, 86, 87, 88 of the third plate 55. The semi annular, rectangular and cylindrical prism protrusions of the fourth plate 60 mated with the semi-annular, rectangular prism and cylindrical prism volumes of the third plate 55 eliminate horizontal shearing between the plates.

The second side 62 of the fourth plate 60 comprises opposing semi-cylindrical volumes 65, 66 proximate the bottom end 64 near the edges of the plate 60. The second side 62 of the fourth plate 60 further comprises a semi-annular volume 96, first rectangular prism volume 97, second rectangular prism volume 98, first shallow cylindrical prism volume 99, second shallow cylindrical prism volume 100, third shallow cylindrical prism volume 101, and fourth cylindrical prism volume 102.

Figure 14:
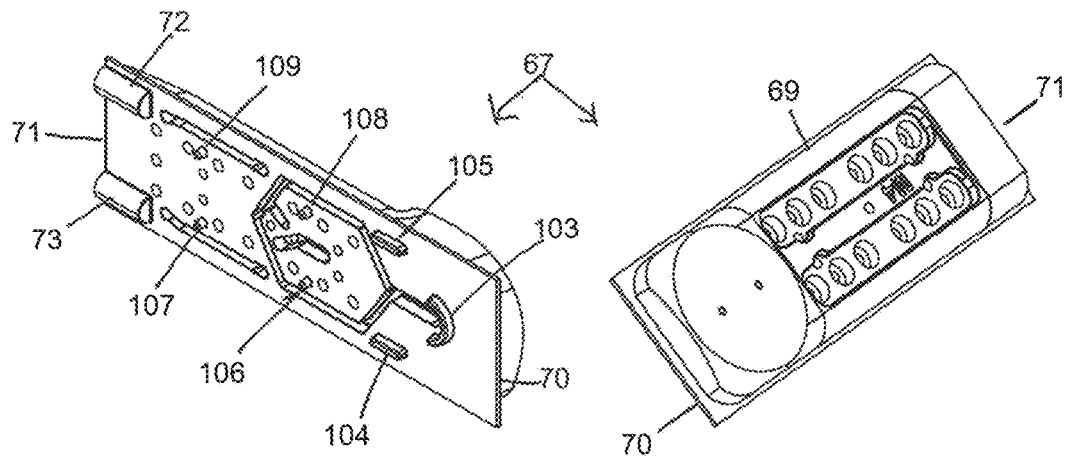
FIG. 14 is a split perspective view of an embodiment of the fifth plate.
Figure 15:
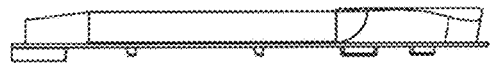
FIG. 15 is a orthogonal view of FIG. 14.
Figure 15:
Figure 15:
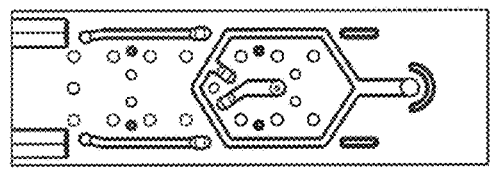
Figure 15:
Figure 15:
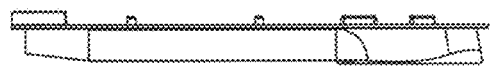

Referring to FIG. 14, a fifth plate 67 comprises a first side 68, second side 69, top end 70, and bottom end 71. The first side 68 of the fifth plate 67 comprises opposing semi-cylindrical protrusions 72, 73 proximate the bottom end 71 near the edges of the fifth plate 67. The first side 68 further comprises a semi-annular protrusion 103, first rectangular prism protrusion 104, second rectangular prism protrusion 105, first cylindrical prism protrusion 106, second cylindrical prism protrusion 107, third cylindrical prism protrusion 108, and fourth cylindrical prism protrusion 109.

The semi-cylindrical protrusions 72, 73, semi-annular protrusion 103, rectangular protrusions 104, 105, and cylindrical protrusions 106, 107, 108, 109 of the fifth plate 67 are positioned and sized so that when the fifth plate 67 is stacked on and bonded to the fourth plate 60, the semi-cylindrical protrusions 72, 73, semi-annular protrusion 103, rectangular protrusions 104, 105 and cylindrical protrusions 106, 107, 108, 109 of the fifth plate 67 fit snugly into the semi-cylindrical volumes 65, 66, semi annular volume 96, rectangular volumes 97, 98, and cylindrical volumes 99, 100, 101, 102 of the fourth plate 60.

The plates 31, 42, 55, 60, 67 are independently created using a molding process. The plates are constructed from a co-polymer material. In one embodiment, the plates are constructed from a copolymer such as Eastman Tritan TX1000 or Tritan TX1000.01. The plates 31, 42, 55, 60, 67 have embossed protrusions and corresponding embossed holes for receiving the protrusions (separately identified in the paragraphs above describing the structure of the plates). The protrusion and corresponding receiving volumes form a mechanical interlock between the plates, which strengthens the bond and prevents deterioration. Bond strength is crucial because the bar gun is being bonded via adhesion, which is inherently less strong than solvent bonding.

The plates also have various channels and inlet/outlet ports necessary for fluid to enter, travel through, and exit the bar gun handle. The structure of such channels and ports is known in the art and not described in detail herein. Some of these features may be included in the mold, and some of these features are machined after the molding process.

Once the plates are independently molded, the plates are bonded together to form a bar gun handle. The first plate 31 is placed in a fixture, or nest like holding container, with the first side 32 down and the second side 33 facing outward and exposed. In some embodiments, the fixture includes a mechanism for enclosing the contents within the fixture and at least one UV lamp.

Adhesive is placed onto the exposed second side 33 of the first plate 32. In one embodiment, an ultraviolet ("UV") adhesive is used with a range of 365 nm-405 nm. In one embodiment an adhesive with a viscosity in the range of 80-300 centiPoise is used. The viscosity range is important because there must be the correct amount of capillary action for the adhesive to sufficiently flow out and cover the surface of the plates. In one embodiment, 0.006 inch of adhesive is placed on both plates.

The second plate 42 is then stacked onto the first plate 31. More specifically, the first side 43 of the second plate 42 onto the second side 33 of the first plate 31. The corresponding protrusions and volumes on the first side 43 of the second plate 42 and second side 33 of the first plate 31 interlock and form a mechanical fit.

The adhesive and stacking steps are repeated with the remaining plates. In the embodiment being shown and described, adhesive is only applied to the exposed plate at the top of the stack. In other embodiments, adhesive may be applied to both the exposed plate on the stack and the plate being added to the stack.

Adhesive is applied to the now exposed second side 44 of the second plate 42. The third plate 55 is stacked onto the second plate 42. More specifically, the first side 56 of the third plate 55 is placed onto the second side 44 of the third plate 42. The corresponding protrusions and volumes on the second side 44 of the second plate 42 and first side 56 of the third plate 55 interlock and form a mechanical fit.

Adhesive is applied to the now exposed second side 57 of the third plate 55. The fourth plate 60 is stacked onto the third plate 55. More specifically, the first side 61 of the fourth plate 60 is placed onto the second side 57 of the third plate 55. The corresponding protrusions and volumes on the second side 57 of the third plate 55 and first side 61 of the fourth plate 60 interlock and form a mechanical fit.

Adhesive is applied to the now exposed second side 62 of the fourth plate 60. The fifth plate 67 is stacked onto the fourth plate 60. More specifically, the first side 68 of the fifth plate 67 is placed onto the second side 62 of the fourth plate 60. The corresponding protrusions and volumes on the second side 62 of the fourth plate 60 and first side 68 of the fifth plate 67 interlock and form a mechanical fit.

Once all five plates are stacked together, pressure is applied to the stack of plates using a press. A mechanical press, pneumatic press, or other suitable press could be used. A clamp may be used to clamp the plates together. A pressure threshold, distance threshold, or time threshold may be used to calculate the amount of pressure to be applied.

The downward pressure applied on the plates causes the adhesive to spread out and cover the surface of the plates, including the surfaces of the interlocking protrusions and volumes.

The stacked plates are enclosed within the fixture. UV light is applied to the combined plates. The UV light cures the UV adhesive, therefore, bonding the plates together. In some embodiments, the fixture comprises one or more UV lamps. In some embodiments, the fixture comprises a reflective interior chamber that will reflect UV light, therefore maximizing the efficiency of UV light introduced to the chamber. The wavelength of UV light used for the curing process corresponds to the wavelength of the UV adhesive. It is important not to overexpose the stacked plates to UV light to avoid burning.

In one embodiment, 3 cures of 20 seconds each are applied. The stack of plates is rotated between each of 20 second cures. Rotating the stack ensures that a more even distribution of UV light is administered to the stack, resulting in a more uniform and stable bond.

Figure 17:
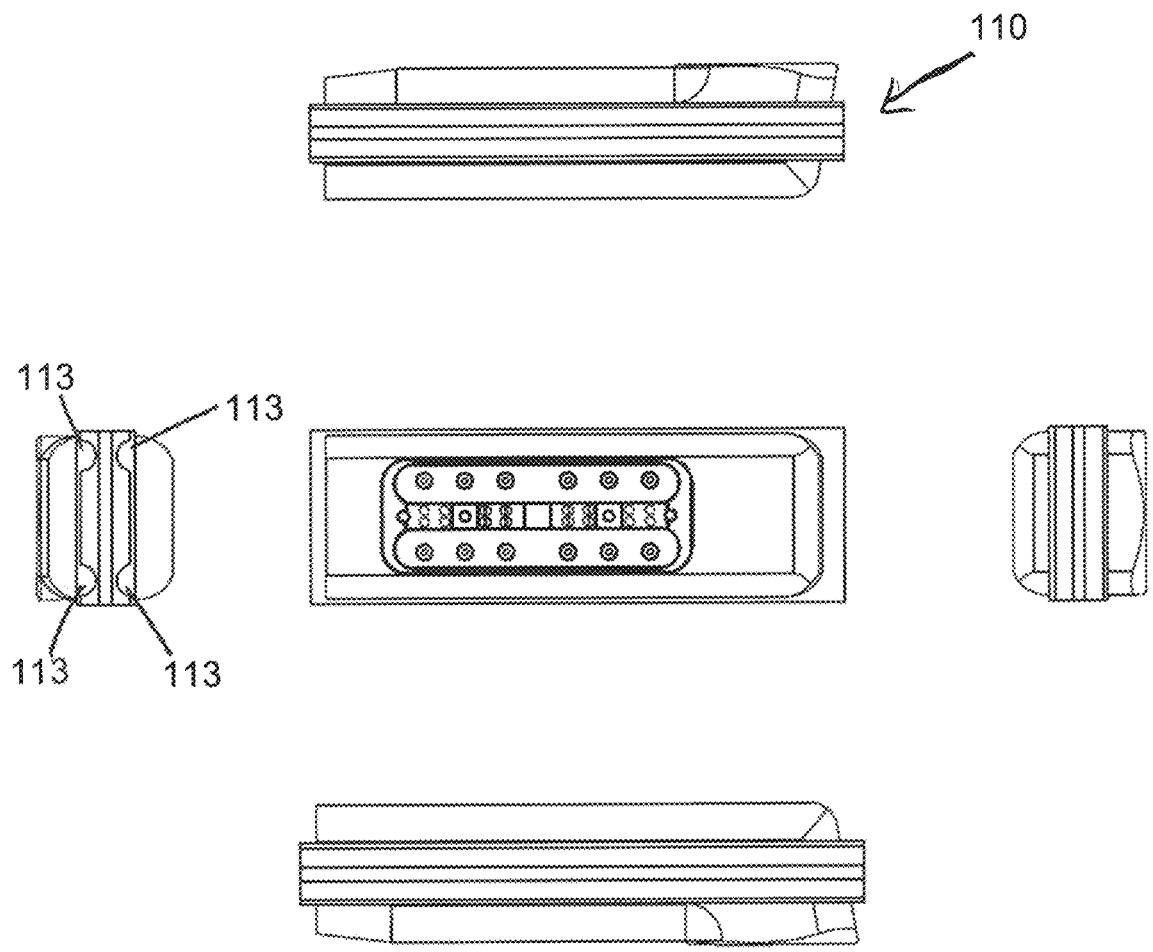
FIG. 17 is a split orthogonal view of an embodiment of the plates bonded together.
Figure 18:
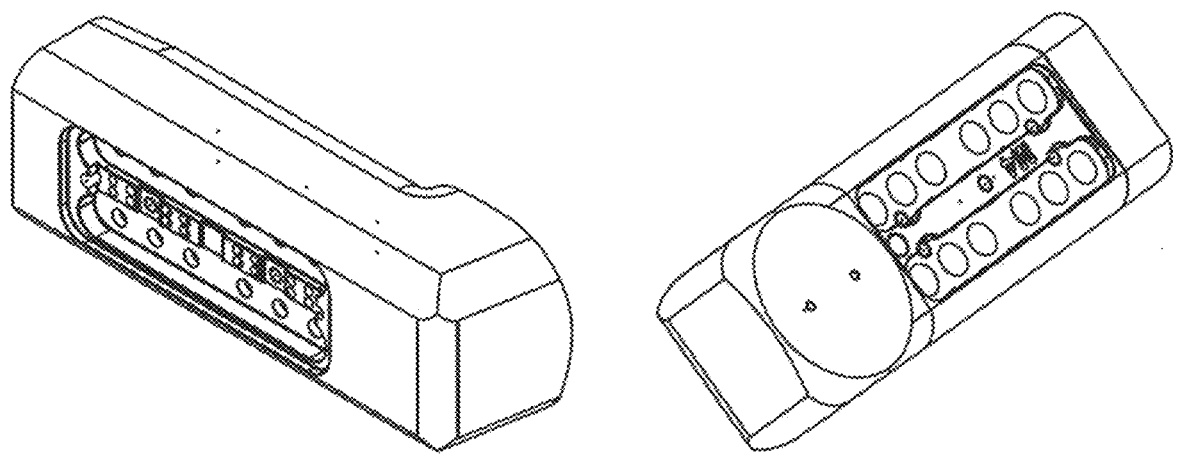
FIG. 18 is a split perspective view of an embodiment of the plates bonded together.
Figure 20:
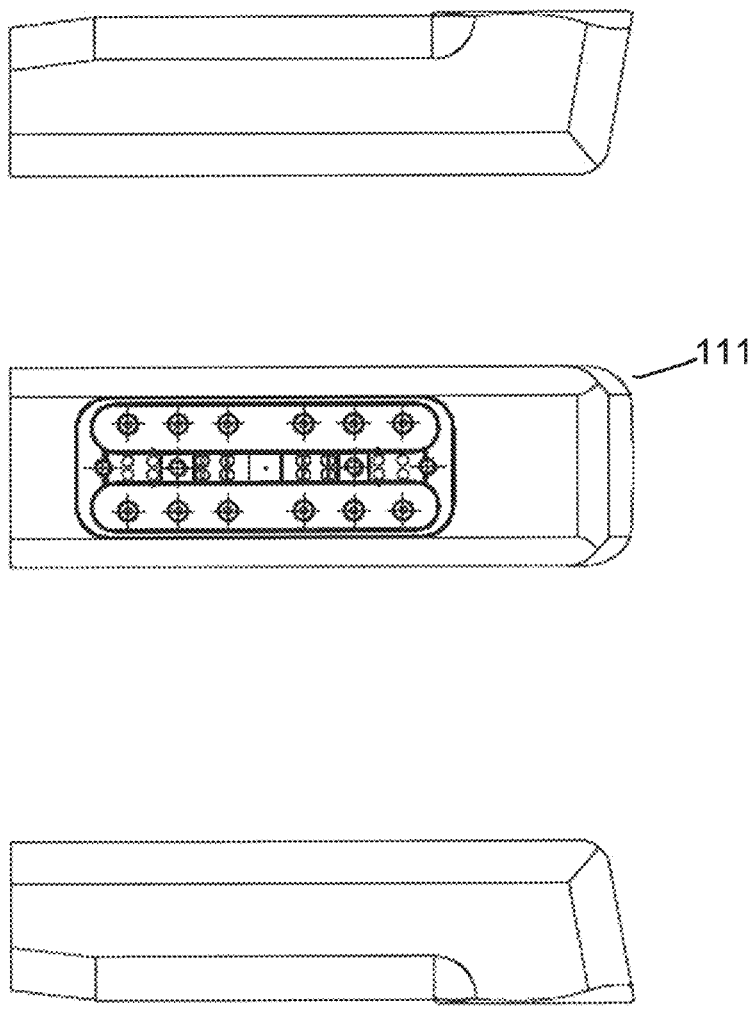
FIG. 20 is a split orthogonal view of an embodiment of the bar gun.

Referring to FIG. 17, the adhesion, pressure, and curing process produces a raw bar gun handle 110. The raw bar gun handle 110 is then contoured to remove additional and unwanted material resulting in a contoured bar gun handle 111, as shown in FIG. 20. In addition, any other conduits desired may be machined out.

Figure 19:
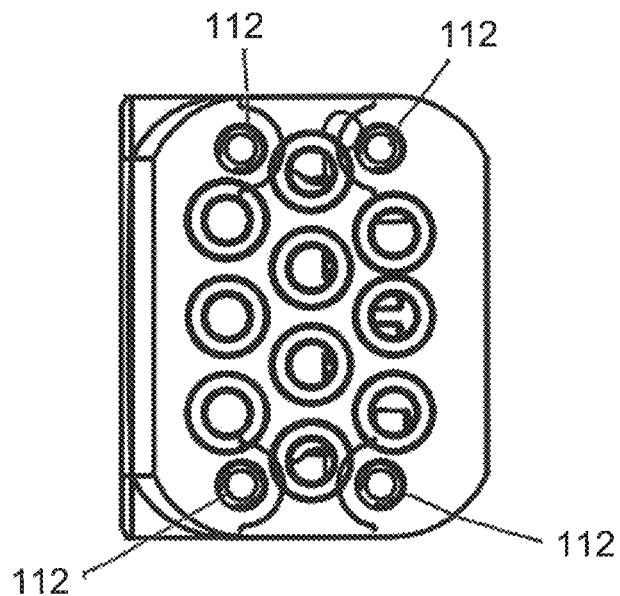
FIG. 19 is a bottom view of an embodiment of the bar gun.

A plate 114 having a plurality of apertures 116 to accommodate a plurality of tubing 118 and screw holes is screwed onto the bottom of the bar gun handle, as shown in FIG. 19. Four screw holes 112 are drilled into the bottom of the bar gun handle. Normally, drilling screw holes into an adhesion bonded bar gun handle would cause the bonding to split, crack, or otherwise fail because the hole would be drilled into a bond line, i.e., the area between two adjoining plates.

To avoid this problem, the present invention comprises screw mounts 113 (See, FIG. 17). The screw mounts are formed by the aforementioned interlocking semi-cylindrical protrusions and volumes 36, 37, 47, 48, 65, 66, 72, 73. The screw mounts 113 enable screw holes 112 to be drilled into the bar gun handle without drilling through a bond line. The screw holes 112 are drilled directly and exclusively into a corresponding screw mount 113. Thus, avoiding drilling into a bond line and compromising the integrity of the bond.

The remaining outlet and inlets are then machined into the bar gun handle. In one embodiment, ten fluid inlets are drilled into the bottom of the bar gun handle so the bar gun can facilitate eight syrups and two waters.

The embodiment described herein comprised the method of manufacturing a carcinogenic-free bar gun by bonding five plates together to form a bar gun handle. Those skilled in the art understand that the method described herein could be used to bond less or more than five plates together to form a bar gun handle. For example, 3 plates could be bonded together to manufacture a two-flavor bar gun handle.

The various embodiments described herein may be used singularly or in conjunction with other similar devices. The present disclosure includes preferred or illustrative embodiments of specifically described apparatuses, assemblies, and systems. Alternative embodiments of such apparatuses, assemblies, and systems can be used in carrying out the invention as described herein. Other aspects and advantages of the present invention may be obtained from a study of this disclosure and the drawings.

We claim:

1. A method of manufacturing a carcinogen-free bar gun handle comprising the follow steps:
   molding a first plate, molding a second plate, molding a third plate, molding a fourth plate, molding a fifth plate;
   inserting the first plate into a fixture;
   stacking the second plate onto the first plate with a layer of adhesive between the first and second plates;
   stacking the third plate onto the second plate with a layer of adhesive between the second and third plates;
   stacking the fourth plate onto the third plate with a layer of adhesive between the third and fourth plates;
   stacking the fifth plate onto the fourth plate with a layer of adhesive between the fourth and fifth plates; wherein the stacking of the second plate, the third plate, the fourth plate and the fifth plate onto the first plate occurs in the fixture while the first plate is inserted in the fixture;
   pressing the stacked plates, the pressing occurring following the stacking of each of the second, third, fourth and fifth plates, wherein the pressure exerted by the pressing of the stacked plates is in the range of 5 to 20 psi and wherein the duration of the pressing of the stacked plates is in the range of 1 to 5 minutes;
   releasing the pressure of the stacked plates;
   curing the adhesive; wherein all components are comprised of carcinogenic-free materials; wherein said adhesive is an ultraviolet curing adhesive with a curing wavelength in the range of 365 nm-405 nm and with a viscosity within the range of 80-300 centiPoise; and
   contouring the assembled carcinogen-free bar gun handle.

2. The method of manufacturing a bar gun handle of claim 1 wherein curing the adhesive further comprises enclosing the stacked plates within a chamber and exposing the stacked plates to ultraviolet light, wherein the interior of the chamber is reflective; wherein the stacked plates are subjected to a plurality of exposures of ultraviolet light, the stacked plates being rotated between each exposure within the plurality of exposures of ultraviolet light.

3. The method of manufacturing a bar gun handle of claim 1 wherein:
   the first plate comprises embossed protrusions;
   the second plate comprises embossed holes;
   the embossed protrusions of the first plate align with the embossed holes of the second plate so that when the second plate is stacked on the first plate the embossed protrusions of the first plate fit within the embossed holes of the second plate, forming a mechanical interlock between the first plate and the second plate.

4. The method of manufacturing a bar gun handle of claim 1 wherein:
   the first plate comprises embossed holes;
   the second plate comprises embossed protrusions;
   the embossed holes of the first plate align with the embossed protrusions of the second plate so that when the second plate is stacked on the first plate the embossed protrusions of the second plate fit within the embossed holes of the first plate, forming a mechanical interlock between the first plate and the second plate.

5. A method of manufacturing a bar gun handle comprising the following steps:
   molding at least two plates;
   stacking the at least two plates on top of one another with a layer of adhesive between the at least two plates;
   pressing the stacked at least two plates;
   curing the adhesive; said curing step further comprising enclosing the stacked at least two plates within a chamber and exposing the stacked at least two plates to ultraviolet light, wherein the stacked at least two plates are subjected to a plurality of exposures of ultraviolet light, the stacked at least two plates being rotated between each exposure within the plurality of exposures of ultraviolet light; wherein said at least two plates and said adhesive are BPA-free and wherein said adhesive is an ultraviolet curing adhesive having a wavelength in the range of 365 nm-405 nm and a viscosity within the range of 80-300 centiPoise; and
   contouring the assembled carcinogen-free bar gun handle.

* * * * *